United States Patent [19]

Burkhard et al.

[11] 4,083,842
[45] Apr. 11, 1978

[54] DIAZO COMPOUNDS CONTAINING TWO OPTIONALLY SUBSTITUTED-5-ARYLAZO-6-HYDROXYPYRIDONE-2 RADICALS LINKED THROUGH THEIR NITROGEN ATOMS

[75] Inventors: Hermann Burkhard, Neuallschwil; Roland Entschel, Allschwil, both of Switzerland

[73] Assignee: Sandoz Ltd., Basel, Switzerland

[21] Appl. No.: 280,355

[22] Filed: Aug. 14, 1972

[30] Foreign Application Priority Data

Aug. 20, 1971 Switzerland .................. 12300/71
Sep. 9, 1971 Switzerland .................. 13299/71

[51] Int. Cl.² .................. C09B 33/12; P06P 1/04; P06P 1/52
[52] U.S. Cl. .................. 260/156; 106/23; 106/288 Q; 106/300; 106/308 Q; 260/146 R
[58] Field of Search .................. 260/146 R, 156

[56] References Cited

U.S. PATENT DOCUMENTS

| 3,402,166 | 9/1968 | Heckl et al. ............... 260/152 |
| 3,467,643 | 9/1969 | Horstmann et al. .......... 260/160 |
| 3,502,643 | 3/1970 | Horstmann et al. .......... 260/152 |
| 3,509,122 | 4/1970 | Horstmann et al. .......... 260/157 |
| 3,513,153 | 5/1970 | Horstmann et al. .......... 260/152 |
| 3,640,674 | 2/1972 | Berrie et al. ............. 260/156 X |
| 3,657,219 | 4/1972 | Ronco et al. .............. 260/176 |

FOREIGN PATENT DOCUMENTS

| 1,813,385 | 7/1970 | Germany .................. 260/156 |
| 1,956,142 | 6/1970 | Germany .................. 260/156 |

*Primary Examiner*—Floyd D. Higel
*Attorney, Agent, or Firm*—Gerald D. Sharkin; Richard E. Vila; Melvyn M. Kassenoff

[57] ABSTRACT

Compounds of the formula

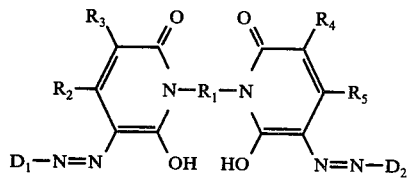

wherein
each of $D_1$ and $D_2$ is independently a diazo component radical, e.g., phenyl, naphthyl, thiazolyl, benzothiazolyl or benzoisothiazolyl, or a substituted derivative thereof,
$R_1$ is divalent hydrocarbyl or substituted hydrocarbyl or a hetero atom-, carbonyl group- or sulfonyl group- containing derivative thereof, e.g., an optionally substituted alkylene, cycloalkylene or phenylene radical, and
each of $R_2$, $R_3$, $R_4$ and $R_5$ is independently hydrogen, cyano, hydrocarbyl or substituted hydrocarbyl or a hetero atom- containing derivative thereof, —$COR_6$, —$CO_2R_6$, —$SO_2R_6$, —$CONR_7R_8$ or —$SO_2NR_7R_8$,
wherein
each $R_6$ is independently hydrocarbyl or substituted hydrocarbyl or a hetero atom-containing derivative thereof, and
each $R_7$ and each $R_8$ is independently hydrogen or $R_6$.

These compounds are useful as pigments for synthetic polymers such as polyolefins, polyesters and polyacrylonitriles, printing inks, emulsion paints, nitrocellulose lacquers, enamels, etc. They are stable to heat and weathering and exhibit good fastness to light and migration.

11 Claims, No Drawings

DIAZO COMPOUNDS CONTAINING TWO OPTIONALLY SUBSTITUTED-5-ARYLAZO-6-HYDROXYPYRIDONE-2 RADICALS LINKED THROUGH THEIR NITROGEN ATOMS

This invention relates to disazo compounds of low solubility, the coupling components of which are two N-pyridyl-2-hydroxy-6-one radicals bound by a bridge member. The novel compounds are useful as pigments.

More particularly, this invention provides compounds of formula I,

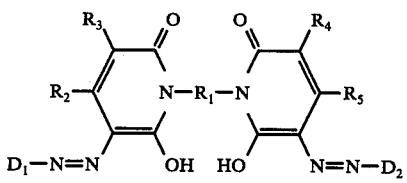

in which
D$_1$ and D$_2$, which may be the same or different, each signifies the radical of a diazo component,
R$_1$ signifies a divalent hydrocarbon radical which may be substituted and which may contain one or more hetero atoms, or a carbonyl or sulphonyl group, and
R$_2$, R$_3$, R$_4$ and R$_5$, which may be the same or different, each signifies hydrogen, cyano, a hydrocarbon radical which may be substituted and which may contain one or more hetero atoms, or a group of the formula —COR$_6$, —COOR$_6$, —SO$_2$R$_6$, —CONR$_7$R$_8$ or —SO$_2$NR$_7$R$_8$, in which R$_6$ signifies a hydrocarbon radical which may be substituted and which may contain one or more hetero atoms and R$_7$ and R$_8$, which may be the same or different, each signifies hydrogen or a hydrocarbon radical which may be substituted and which may contain one or more hetero atoms,
provided that the compounds contain no carboxylic or sulphonic acid groups.

Preferred radicals D$_1$ and D$_2$ include phenyl, naphthyl and heterocyclic radicals such as thiazolyl, benzothiazolyl and benzisothiazolyl radicals, any of which may be substituted, for example by substituents indicated below.

Suitable hydrocarbon radicals include saturated or unsaturated aliphatic, cycloaliphatic or aromatic radicals, e.g. C$_{1-4}$ alkyl or alkenyl, cycloalkyl, e.g. cyclohexyl and phenyl radicals. Examples of hydrocarbon radicals containing hetero atoms are pyridyl and morpholyl radicals, the radical of the formula

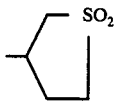

(sulpholyl), and the heterocyclic radicals indicated as suitable for the diazo component radicals, D$_1$ and D$_2$.

Any of these radicals may be substituted, except by carboxylic and sulphonic acid groups. Suitable substituents on any aliphatic radical present include halogen, in particular chlorine or bromine atom, cyano, thiocyano, hydroxyl, alkoxy, preferably of 1 to 4 carbon atoms, phenoxy, phenyl, acyl, acyloxy and acylamino groups.

In addition to any of these substituents suitable substituents or radicals of aromatic character also include alkyl, preferably C$_{1-4}$ alkyl, and nitro.

Any aliphatic radicals may be straight or branched chain and, as indicated, preferably contain 1, 2, 3 or 4 carbon atoms.

The radical R$_1$ may, for example, signify a straight or branched chain alkylene radical which has 1 to 10 carbon atoms, which may be substituted and which may be interrupted by one or more hetero atoms, or a cycloalkylene radical, e.g. cyclohexylene radical, in particular the 1,4-cyclohexylene radical, which may be substituted, an arylene radical, in particular the phenylene radical, which may be substituted, a heterocyclic radical, or a group of formula —(CH$_2$)$_m$—R$_7$—(CH$_2$)$_n$- in which $m$ and $n$, which may be the same or different, each signifies 0, 1, 2, 3 or 4, the total of the $m$ and $n$ being at least 1, and R$_7$ signifies a divalent cyclic radical which may be substituted and may contain hetero atoms. Suitable radicals R$_7$ include those indicated above for R$_1$. Suitable substituents on any substituted such R$_1$ and R$_7$ radicals include those indicated above.

The preferred acyl groups are those of the formula

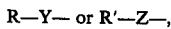

in which
R either signifies a hydrocarbon radical which may be substituted and which may contain hetero atoms, preferably an alkyl or phenyl radical optionally substituted by substituents indicated above, and
R' signifies a hydrogen atom or has a significance as indicated above for R, or
R' may be a member of a heterocyclic radical,
Y signifies —O—CO—, —SO$_2$— or —O—SO$_2$—, and
Z signifies —CO—, —NR"CO— or —NR"SO$_2$—,
R" signifies a hydrogen atom or has a significance as indicated above for R, or R" may be a member of a heterocyclic ring.

As used herein, "halogen" means chlorine, bromine fluorine or iodine, preferably chlorine or bromine.

The preferred compounds of the invention are those of formula Ia,

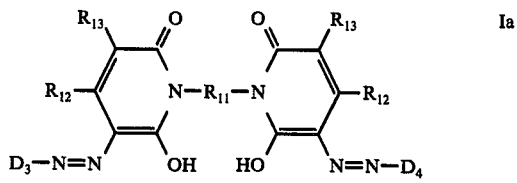

in which
D$_3$ and D$_4$ are the same or different and each signifies a phenyl radical which may be substituted by chlorine, bromine, cyano, nitro, methyl, trifluoromethyl, methoxy, ethoxy, methylsulphonyl, aminosulphonyl (sulfamoyl), phenoxysulphonyl, sulphoguanidine guanidinosulfonyol,

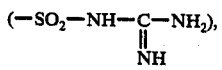

methoxycarbonyl, ethoxycarbonyl, aminocarbonyl (carbamoyl) or a group of the formula

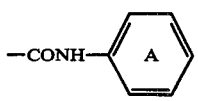

(phenylcarbamoyl) in which the aromatic nucleus A may be substituted by chlorine, bromine, methyl or ethyl, $R_{11}$ signifies a straight or branched chain alkylene radical of up to 6 carbon atoms; a 1,4-phenylene radical which may be substituted by chlorine, bromine; methyl, methoxy or ethoxy; a 1,4-, 1,5-, 2,6- or 2,7-naphthylene radical, or a 4,4'-diphenylene radical which may be substituted by chlorine, bromine, methyl or methoxy, the radicals $R_{12}$ are the same or different and each signifies methyl or phenyl and the radicals $R_{13}$ are the same or different and each signifies cyano, aminocarbonyl, methylsulphonyl or aminosulphonyl.

Especially preferred compounds are those of formula Ib,

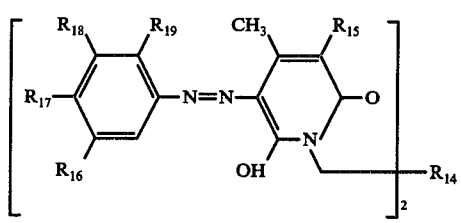

where
$R_{14}$ signifies 1,4-phenylene or 1,4-phenylene substituted in the 2- and 5-positions by chlorine, bromine, methyl, methoxy or ethoxy, or 1,4-, 1,5-, 2,6- or 2,7-naphthylene or 4,4'-diphenylene, unsubstituted or substituted in the 3- and 3'-positions by methyl or chlorine, or alkylene containing 2 to 6 carbon atoms, $R_{15}$ signifies cyano or aminocarbonyl, $R_{16}$ signifies hydrogen, chlorine, bromine, aminocarbonyl, methoxycarbonyl, sulphoguanidine or a group of the formula

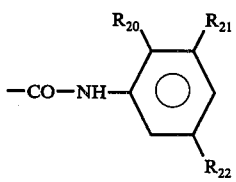

$R_{17}$ signifies hydrogen, chlorine, bromine or methoxycarbonyl, $R_{18}$ signifies hydrogen or methoxycarbonyl, $R_{19}$ signifies hydrogen, chlorine, bromine, methyl or methoxycarbonyl, $R_{20}$ signifies hydrogen or methyl, and $R_{21}$ and $R_{22}$ which may be the same or different each signifies hydrogen, chlorine or bromine.

The invention also provides a process for the production of compounds of formula I characterised by coupling the diazonium derivative of a compound of formula IIa, $$D_1-NH_2 \qquad \text{IIa}$$

in which $D_1$ is as defined above, and, where
$D_1$ and $D_2$ are different, of a compound of formula IIb
in which $D_2$ is as defined above,
with a compound of formula III,

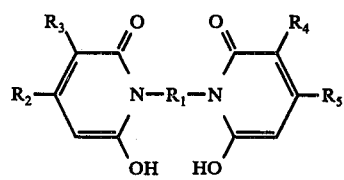

in which $R_1$ to $R_5$ are as defined above.

The coupling reaction may suitably be effected in aqueous, preferably weakly acid solution and at a temperature of from 0° to 40° C. If required an inert solvent or dispersing agent may be used. Suitable solvents are those miscible with water, for instance lower alcohols, e.g. methanol, ethanol, ethylene glycol monomethyl ether and monoethyl ether, lower ketones, such as acetone, and tertiary nitrogen bases, such as pyridine. Also suitable are dimethylformamide and certain water immiscible optionally halogenated or nitrated hydrocarbons, e.g. toluene, chlorobenzene and nitrobenzene. Suitable dispersing agents are, for example, adducts of alkylene oxide, particularly ethylene oxide, with fatty alcohols or fatty acids, and condensation products of naphthalenesulphonic acids with formaldehyde.

The resulting compounds of formula I may be isolated by standard methods and may be dried and pulverized. They may then be used as such for pigmentation, although treatment of the pulverized pigment in an organic solvent and at high temperature is preferable for improvement of the pigmentary quality.

The coupling components of formula (III) may, for example, be produced by condensation in manner known per se of a compound of formula IV

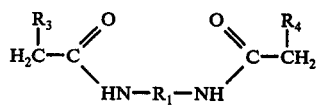

in which $R_1$, $R_3$ and $R_4$ are as defined above, with an ester of formula Va

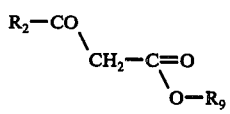

in which
$R_9$ signifies an alkyl radical with 1 to 4, preferably 2, carbon atoms, and, where
$R_2$ and $R_5$ are different, with a compound of formula Vb,

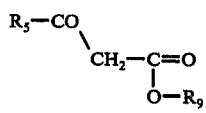

in which $R_5$ and $R_9$ are as defined above.

The diazo derivatives of the compounds of formula IIa and IIb are either known or may be produced in conventional manner from available materials as are the compounds of formula IIa and IIb themselves.

The compounds of formula IV, Va and Vb are either known or may be produced in conventional manner from available materials.

The disazo compounds of the invention are suitable for the pigmentation of organic materials of high molecular weight, including printing ink vehicles, oil, water and solvent based surface coatings, for example emulsion paints, nitrocellulose lacquers and stoving enamels, synthetic polymers such as polyolefins, e.g. polypropylene, and polyvinyl chloride, and fibres from synthetic polymers such as polyester, polyacrylonitrile and polyolefin fibres. They pigment these materials in various shades of yellow to red, or if applied in combination with titanium dioxide or other white pigments in pastel shades of the same colour. When incorporated in these organic materials, the pigments have particularly favourable properties regarding heat stability and weathering and, especially, light and migration fastness. In paints they show good fastness to overspraying.

In the following Examples the parts and percentages are by weight and the temperatures in degrees centigrade.

EXAMPLE 1

12.75 Parts of 1-amino-4-chlorobenzene are dissolved in 300 parts of 4% hydrochloric acid and diazotized at 0° with 6.9 parts of sodium nitrite. Any excess of nitrous acid is decomposed with amidosulphonic acid and the diazo solution filtered.

For coupling, 19.1 parts of 1,6-hexylene-N,N'-di-(3'-cyano-4'-methyl-6'-hydroxypyridone-2') are dissolved in 250 parts of water with the addition of 5 parts of sodium hydroxide and with gentle heating. The solution is cooled to about 5° by the addition of ice and adjusted to pH 4 with glacial acetic acid, on which the coupling component settles out in fine crystalline form. Over the course of one hour, the diazo solution is allowed to flow into the suspension thus formed, with constant stirring. Soon after addition of the diazo solution is commenced, the pigment begins to settle out as a fine powder of yellow-brown colour. After the addition, stirring is continued for 2 hours to allow reaction to the end-point. The yellow-brown pigment is isolated by filtration. On recrystallization it melts at 304°. Incorporated in plasticized polyvinyl chloride, it produces attractive greenish yellow shades showing excellent fastness properties.

The 1,6-hexylene-N,N'-di-(3'-cyano-4'-methyl-6'-hydroxypyridone-2') is formed by condensation of acetoacetic ester with 1,6-di-(cyanoacetic acid)-hexylene diamide at an elevated temperature (100°–160°), with simultaneous distillation of the liberated alcohol.

EXAMPLE 2

41.8 Parts of aminoterephthalic acid dimethyl ester are added to 120 parts of 5N hydrochloric acid and stirred for one hour. The solution is then cooled by the addition of 100 parts of ice and diazotized with 13.8 parts of sodium nitrite. Any excess nitrous acid that may be present is decomposed with amidosulphonic acid and the diazo solution filtered.

For coupling, 42.3 parts of 2-methyl-5-chloro-1,4-phenylene-N,N'-di-(3'cyano-4'-methyl-6'-hydroxypyridone-2') are dissolved in 300 parts of water with the addition of 10 parts of sodium hydroxide. The solution is filtered, adjusted to 5 with ice, and glacial acetic acid dropped in until pH 5 is reached, which causes the coupling component to settle out in fine white crystalline form. Over the course of one hour the diazo solution is allowed to flow gradually into the resulting suspension, with simultaneous dropwise addition of 30% sodium hydroxide solution to keep the pH constant at 5.0. During this time, the newly formed disazo pigment settles out as a greenish yellow precipitate. To complete the reaction, stirring is continued for 2 hours at 40° and 1 hour at 80°. The pigment is isolated by filtration, washed and dried at 80° and 50 mm Hg pressure.

Incorporated in polyvinyl chloride, this pigment gives brilliant greenish yellow shades.

In manner analogous to the preceding Examples and employing an equivalent amount of the diazo and coupling components listed in the following Table, further products of the invention, having in polyvinyl chloride the shade noted in the final column in the Table, are obtained.

TABLE

| Example No. | Diazo component from | Coupling component | Shade in PVC |
|---|---|---|---|
| 3 | 2,4-dichloroaniline | 1,4-phenylene-N,N'-di-(3'-cyano-4'-methyl-6'-hydroxypyridone-2') | yellow |
| 4 | 2,5-dichloroaniline | " | " |
| 5 | aminoterephthalic dimethyl ester | " | " |
| 6 | 5-aminoisophthalic dimethyl ester | " | " |
| 7 | 3-amino-4-chlorobenzoic methyl ester | " | " |
| 8 | 2-amino-4-chlorobenzoic methyl ester | " | " |
| 9 | 4-aminobenzoic methyl ester | " | " |
| 10 | 4-amino-3-chlorobenzoic methyl ester | " | " |
| 11 | 3-amino-4-chlorobenzoic amide | " | " |
| 12 | 3-amino-4-chlorobenzoic anilide | " | " |
| 13 | 3-amino-4-chlorobenzoic acid-2'-methyl-3'-chloranilide | " | " |
| 14 | 3-amino-4-chlorobenzoic acid-2'-methyl-5'-chloranilide | " | " |
| 15 | 3-aminio-4-chlorobenzene-sulphoguanidine | 1,4-phenylene-N,N'-di-(3'-cyano-4'-methyl-6'-hydroxypyridone-2') | yellow |
| 16 | 3-amino-4-methylbenzenesulfoguanidine-5 guanidinosulfonyl-2 methylaniline | " | " |
| 17 | aminoterephthalic dimethyl ester | 2,5-dichloro-1,4-phenylene-N,N'-di-(3'-cyano-4'-methyl-6'-hydroxypyridone-2') | " |
| 18 | 3-amino-4-chlorobenzoic anilide | " | " |
| 19 | 3-amino-4-chlorobenzoic acid-2'-methyl-3'-chloroanilide | " | " |
| 20 | aminoterephthalic dimethyl ester | 2,5-dimethyl-1,4-phenylene-N,N'-di-(3'-cyano-4'-methyl-6'-hydroxypyridone-2') | orange |
| 21 | 3-amino-4-chlorobenzoic anilide | 2,5-dimethyl-1,4-phenylene-N,N'-di- | " |

TABLE-continued

| Example No. | Diazo component from | Coupling component | Shade in PVC |
|---|---|---|---|
| 22 | 3-amino-4-chlorobenzoic acid-2'-methyl-3'-chloroanilide | (3'-cyano-4'-methyl-6'-hydroxy-pyridone-2') | " |
| 23 | aminoterephthalic dimethyl ester | 2,5-dimethoxy-1,4-phenylene-N,N'-di-(3'-cyano-4'-methyl-6'-hydroxy-pyridone-2') | red |
| 24 | 3-amino-4-chlorobenzoic anilide | " | " |
| 25 | 3-amino-4-chlorobenzoic acid-2'-methyl-3'-chloroanilide | " | " |
| 26 | aminoterephthalic dimethyl ester | 2,5-diethoxy-1,4-phenylene-N,N'-di-(3'-cyano-4'-methyl-6'-hydroxy-pyridone-2') | " |
| 27 | 3-amino-4-chlorobenzoic anilide | " | " |
| 28 | 3-amino-4-chlorobenzoic acid-2'-methyl-3'-chloroanilide | " | " |
| 29 | 3-amino-4-chlorobenzoic anilide | 1,4-naphthylene-N,N'-di-(3'-cyano-4'-methyl-6'-hydroxypyridone-2') | yellow |
| 30 | 3-amino-4-chlorobenzoic anilide | 1,5-naphthylene-N,N'-di-(3'-cyano-4'-methyl-6'-hydroxypyridone-2') | " |
| 31 | " | 2,6-naphthylene-N,N'-di-(3'-cyano-4'-methyl-6'-hydroxypyridone-2') | " |
| 32 | " | 2,7-naphthylene-N,N'-di-(3'-cyano-4'-methyl-6'-hydroxypyridone-2') | " |
| 33 | 3-amino-4-chlorobenzoic anilide | 3,3'-dimethyl-4,4'-diphenylene-N,N'-di-(3''-cyano-4''-methyl-6''-hydroxypyridone-2'') | yellow |
| 34 | " | 3,3'-dichloro-4,4'-diphenylene-N,N'-di-(3''-cyano-4''-methyl-6''-hydroxypyridone-2'') | " |
| 35 | 2,4-dichloroaniline | 1,2-ethylene-N,N'-di-(3'-cyano-4'-methyl-6'-hydroxypyridone-2') | " |
| 36 | aminoterephthalic dimethyl ester | " | " |
| 37 | 2-amino-4-chlorobenzoic anilide | " | " |
| 38 | 3-amino-4-chlorobenzoic acid-2'-methyl-3'-chloroanilide | " | " |
| 39 | 3-amino-4-chlorobenzoic acid-2'-methyl-5'-chloroanilide | 1,2-ethylene-N,N'-di-(3'-cyano-4'-methyl-6'-hydroxypyridone-2') | " |
| 40 | aminoterephthalic dimethyl ester | 1,3-propylene-N,N'-di-(3'-cyano-4'-methyl-6'-hydroxypyridone-2') | " |
| 41 | 3-amino-4-chlorobenzoic acid-2'-methyl-3'-chloroaniline | " | " |
| 42 | 3-amino-4-chlorobenzoic acid-2'-methyl-5'-chloroanilide | " | " |
| 43 | aminoterephthalic dimethyl ester | 1,6-hexylene-N,N'-di-(3'-cyano-4'-methyl-6-hydroxypyridone-2') | " |
| 44 | 3-amino-4-chlorobenzoic acid-2'-methyl-3'-chloroanilide | 1,6-hexylene-N,N'-di-(3'-cyano-4'-methyl-6-hydroxypyridone-2') | yellow |
| 45 | 3-amino-4-chlorobenzoic acid-2'-methyl-5'-chloroanilide | " | " |
| 46 | aminoterephthalic dimethyl ester | 1,3-propylene-N,N'-di-(3'-carbonamide-4'-methyl-6'-hydroxypyridone-2') | " |
| 47 | 2,4-dichloroaniline | " | " |
| 48 | 4-chloro-3-aminobenzoic anilide | 1,3-propylene-N,N'-di-(3'-carbonamide-4'-methyl-6'-hydroxypyridone-2') | " |
| 49 | 2,4-dibromoaniline | " | " |
| 50 | 2-chloro-4-trifluoromethyl-aniline | 1,4-phenylene-N,N'-di-(3'-cyano-4'-methyl-6'-hydroxypyridone-2') | " |
| 51 | 3-nitroaniline | " | " |
| 52 | 3-amino-4-methoxybenzene-sulphoguanidine | " | " |
| 53 | 3-amino-4-ethoxybenzene-sulphoguanidine | 1,4-phenylene-N,N'-di-(3'-cyano-4'-phenyl-6'-hydroxypyridone-2') | " |
| 54 | 3-amino-4-chlorobenzoic acid-2'-methyl-3'-bromoanilide | " | " |
| 55 | 2-chloro-4-cyanoaniline | 1,4-phenylene-N,N'-di-(3'-methyl-sulphonyl-4'-methyl-6'-hydroxy-pyridone-2') | yellow |
| 56 | 3-phenoxysulphonylaniline | 1,4-phenylene-N,N'-di-(3'-cyano-4'-methyl-6'-hydroxypyridone-2') | " |
| 57 | 2,5-dibromoaniline | " | " |
| 58 | aminoterephthalic dimethyl ester | 2,5-dibromo-1,4-phenylene-N,N'-di-(3'-cyano-4'-methyl-6'-hydroxy-pyridone-2') | " |

It will be appreciated that, in the products of the foregoing Examples, the diazo component is, of course, bonded to both rings of the coupling component.

The formulae of representative products of the foregoing Examples are as follows:

Example 5
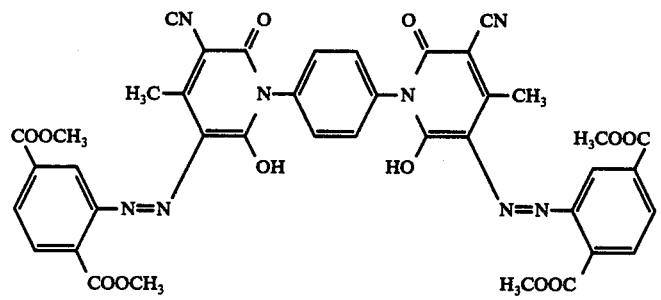
Example 7
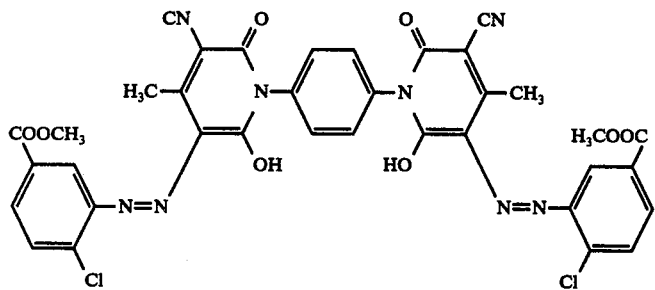
Example 13
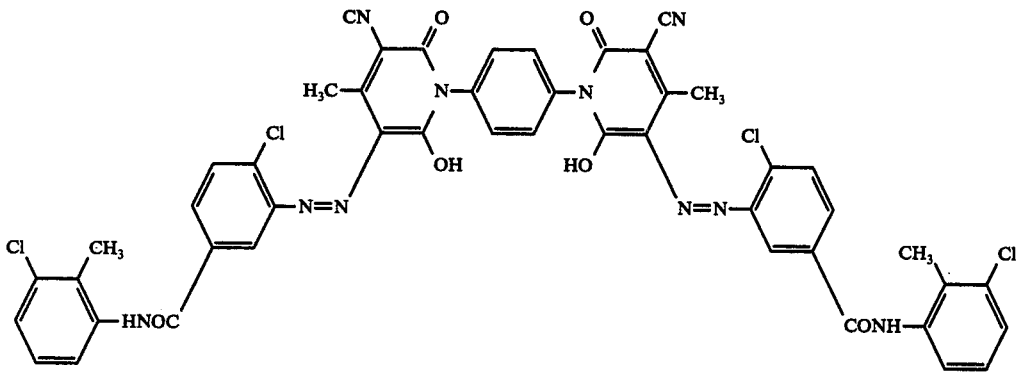
Example 38
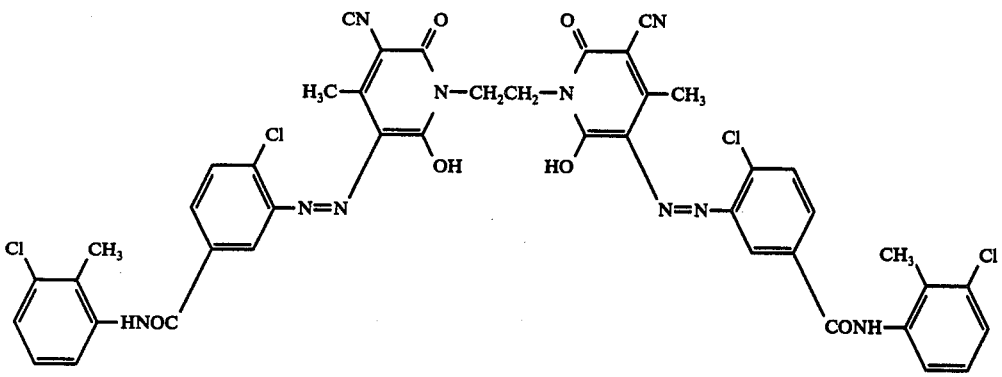

Example 41

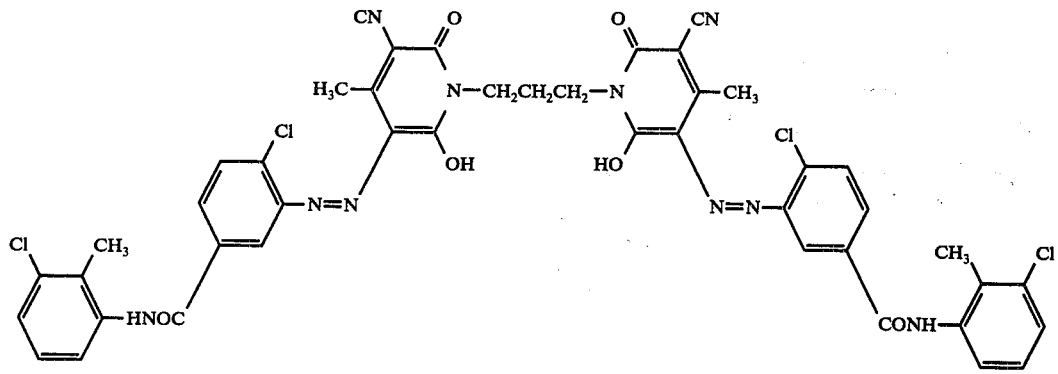

Example 59

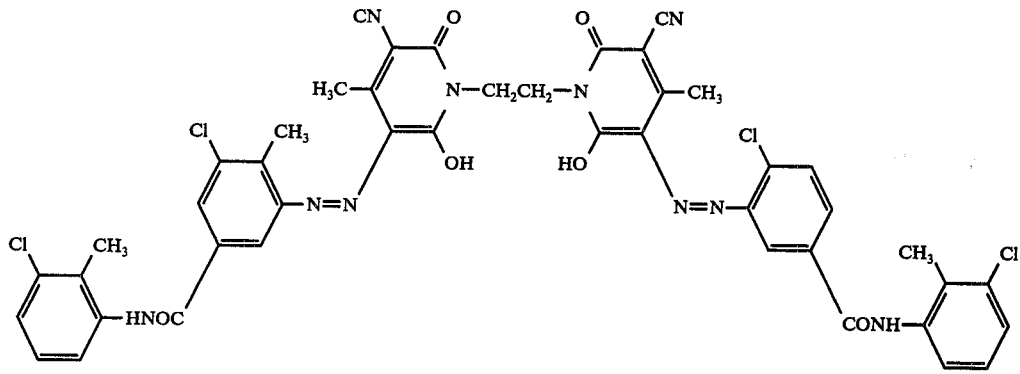

APPLICATION EXAMPLE A

Four parts by weight of the pigment of Example 2 are ground in a ball mill for 24 hours with 96 parts by weight of a mixture of
50 parts by weight of a 60% solution of coconut oil-alkyd-melamine resin of 43% fatty acid content in xylene,
30 parts by weight of a 50% melamine resin solution in butanol,
10 parts by weight of xylene and
10 parts by weight of ethylene glycol monoethyl ether.

The dispersion thus formed is sprayed on sheet metal, the coating allowed to dry in the air for 30 minutes and then stoved for 30 minutes at 120°. A brilliant greenish yellow enamel coating is obtained which shows very good light and weathering resistance.

APPLICATION EXAMPLE B 0.5 Parts by weight of the pigment of Example 2 and 5 parts of titanium dioxide (rutile) are intimately mixed with a base mixture of
63 parts by weight of a polyvinyl chloride emulsion,
32 parts by weight of dioctyl phthalate,
3 parts by weight of an epoxy plasticizer,
1.5 parts by weight of a barium-calcium complex as stabilizer and
0.5 parts by weight of a chelator.

To improve the pigment distribution the mixture is processed for 8 minutes on a roller mill heated to 160° and exerting frictional force (one roller rotating at 20 r.p.m., the other at 25 r.p.m.). It is then extruded as a film of 0.3 millimeters thickness, which has very good light and migration fastness and is stable to heat.

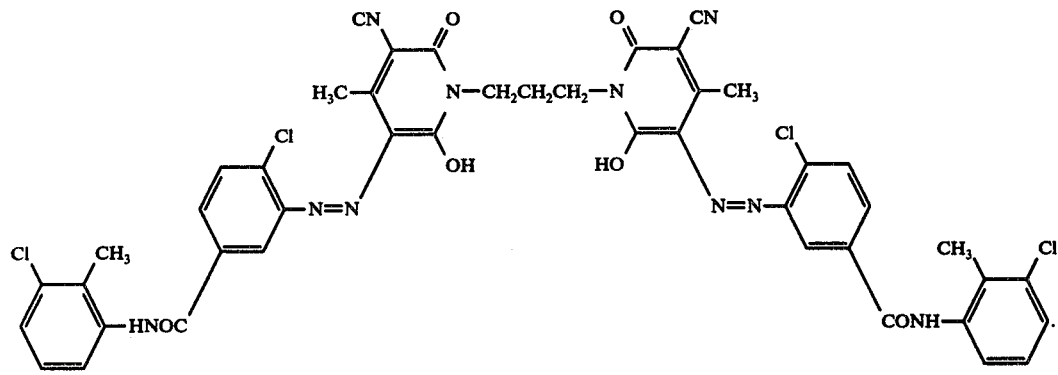
10. The compound according to claim 4 having the formula
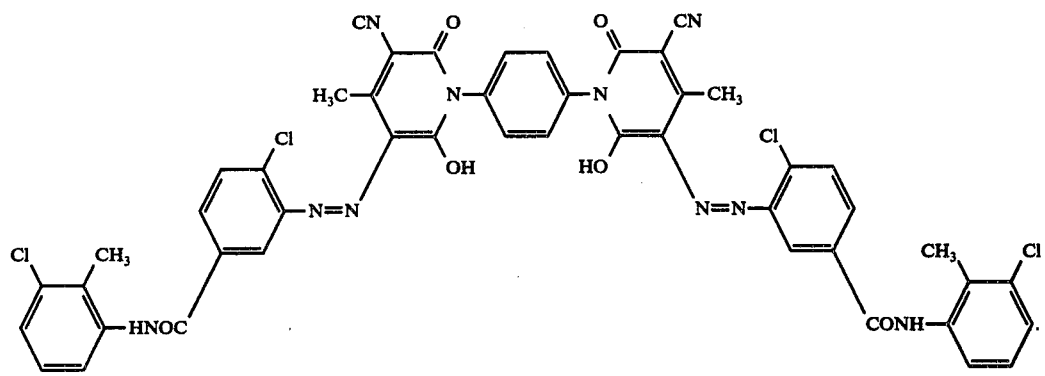
11. The compound according to claim 4 having the formula
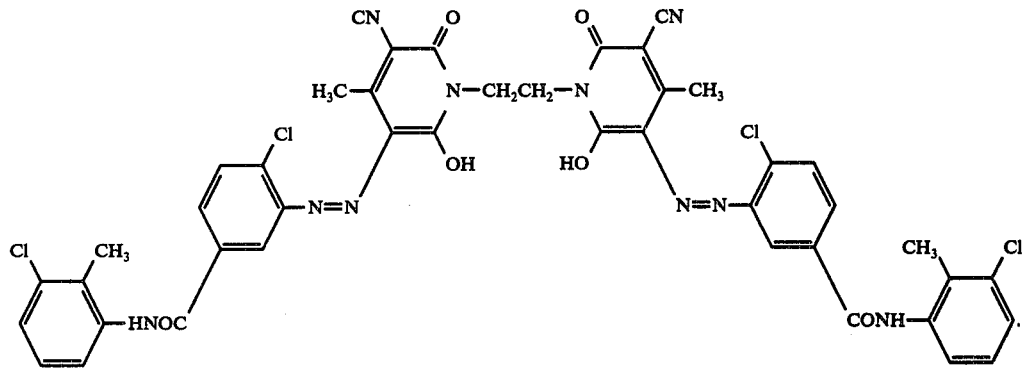

What is claimed is:

1. A compound of the formula

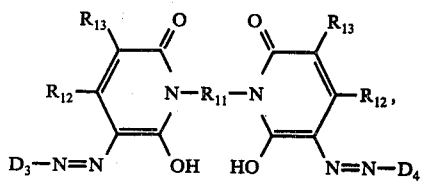

wherein
each of $D_3$ and $D_4$ is independently phenyl or substituted phenyl wherein each substituent is independently chloro, bromo, cyano, nitro, methyl, trifluoromethyl, methoxy, ethoxy, methylsulfonyl, sulfamoyl, phenoxysulfonyl, guanidinosulfonyl, methoxycarbonyl, ethoxycarbonyl, carbamoyl, phenylcarbamoyl or substituted phenylcarbamoyl wherein each substituent is independently chloro, bromo, methyl or ethyl,
$R_{11}$ is straight or branched chain alkylene having up to six carbon atoms, 1,4-phenylene, substituted 1,4-phenylene wherein each substituent is independently chloro, bromo, methyl, methoxy or ethoxy, 1,4-naphthylene, 1,5-naphthylene, 2,6-naphthylene, 2,7-naphthylene, 4,4'-diphenylene or substituted 4,4'-diphenylene wherein each substituent is independently chloro, bromo, methyl or methoxy,
each $R_{12}$ is independently methyl or phenyl, and
each $R_{13}$ is independently cyano, carbamoyl, methylsulfonyl or sulfamoyl.

2. A compound according to claim 1 wherein each of $D_3$ and $D_4$ is phenyl or substituted phenyl having 1 or 2 substituents wherein each substituent is independently chloro, bromo, cyano, nitro, methyl, trifluoromethyl, methoxy, ethoxy, methylsulfonyl, sulfamoyl, phenoxysulfonyl, guanidinosulfonyl, methoxycarbonyl, ethoxycarbonyl, carbamoyl, phenylcarbamoyl or substituted phenylcarbamoyl having 1 or 2 substituents wherein each substituent is independently chloro, bromo, methyl or ethyl, $R_{11}$ is straight or branched chain alkylene having up to six carbon atoms, 1,4-phenylene, 1,4-(disubstituted)phenylene wherein each substituent is chloro, bromo, methyl, methoxy or ethoxy, 1,4-naphthylene, 1,5-naphthylene, 2,6-naphthylene, 2,7-naphthylene, 4,4'-diphenylene or 4,4'-(disubstituted)diphenylene wherein each substituent is chloro, bromo, methyl or methoxy, each $R_{12}$ is methyl or phenyl, and each $R_{13}$ is cyano, carbamoyl, methylsulfonyl or sulfamoyl.

3. A compound according to claim 1 having the formula

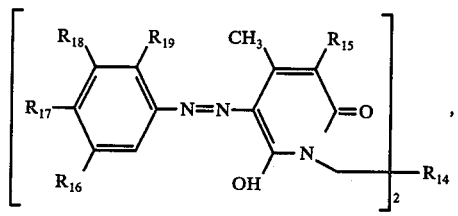

wherein $R_{14}$ is 1,4-phenylene, 1,4-(2,5-disubstituted)phenylene wherein each substituent is chloro, bromo, methyl, methoxy or ethoxy, 1,4-naphthylene, 1,5-naphthylene, 2,6-naphthylene, 2,7-naphthylene, 4,4'-diphenylene, 4,4'-(3,3'-disubstituted)diphenylene wherein each substituent is methyl or chloro or alkylene of 2 to 6 carbon atoms, each $R_{15}$ is cyano or carbamoyl, each $R_{16}$ is hydrogen, chloro, bromo, carbamoyl, methoxycarbonyl, guanidinosulfonyl or

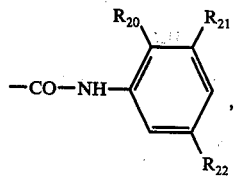

wherein $R_{20}$ is hydrogen or methyl, $R_{21}$ is hydrogen, chloro or bromo, and $R_{22}$ is hydrogen, chloro or bromo, each $R_{17}$ is hydrogen, chloro, bromo or methoxycarbonyl, each $R_{18}$ is hydrogen or methoxycarbonyl, and each $R_{19}$ is hydrogen, chloro, bromo, methyl or methoxycarbonyl.

4. A compound according to claim 3 wherein $R_{14}$ is 1,4-phenylene, 1,4-(2,5-disubstituted)phenylene wherein each substituent is chloro, bromo, methyl, methoxy or ethoxy, 1,4-naphthylene, 1,5-naphthylene, 2,6-naphthylene, 2,7-naphthylene, 4,4'-diphenylene, 4,4'-(3,3'-disubstituted)-diphenylene wherein each substituent is methyl or chloro or —$(CH_2)_p$— wherein p is 2 to 6.

5. A compound according to claim 4 wherein $R_{14}$ is —$(CH_2)_p$— wherein p is 2 to 6.

6. A compound according to claim 4 wherein $R_{14}$ is 1,4-naphthylene, 1,5-naphthylene, 2,6-naphthylene or 2,7-naphthylene.

7. The compound according to claim 4 having the formula

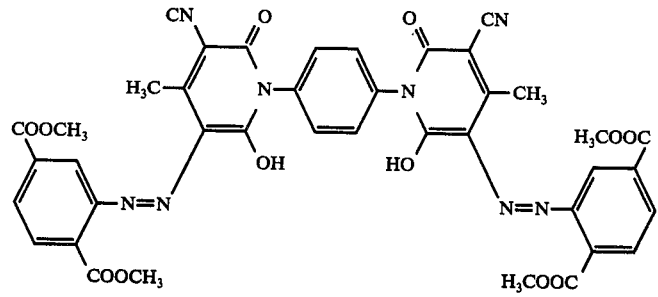

8. The compound according to claim 4 having the formula

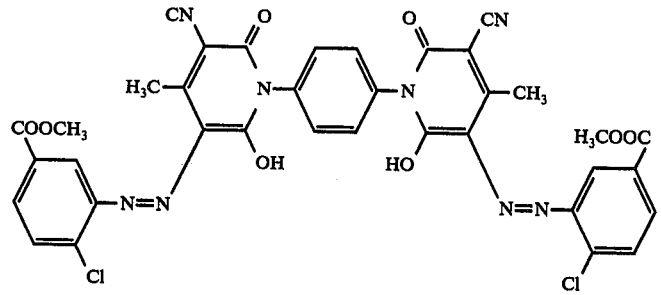

9. The compound according to claim 4 having the formula